United States Patent [19]
Eickmann

[11] Patent Number: 4,876,850
[45] Date of Patent: Oct. 31, 1989

[54] COMBUSTION ENGINE FOR SOLID BLOCK FUEL

[76] Inventor: Karl Eickmann, 2420 Isshiki, Hayama-machi, Kanagawa-ken, Japan

[21] Appl. No.: 107,460

[22] Filed: Aug. 19, 1987

Related U.S. Application Data

[63] Continuation-in-part of Ser. No. 799,663, Nov. 14, 1985, abandoned, and a continuation-in-part of Ser. No. 803,035, Nov. 29, 1985, abandoned, which is a continuation-in-part of Ser. No. 531,513, Sep. 9, 1983, which is a continuation-in-part of Ser. No. 224,772, Jan. 1, 1981, abandoned.

[51] Int. Cl.$^4$ .................................. F02C 3/28
[52] U.S. Cl. .................................. 60/39.464; 60/39.63
[58] Field of Search ............... 60/39.464, 39.6, 39.68; 123/23, 204

[56] References Cited

U.S. PATENT DOCUMENTS

| | | | |
|---|---|---|---|
| 2,805,896 | 9/1957 | Yellott | 60/39.464 |
| 2,923,575 | 2/1960 | Allen | 60/39.464 |
| 4,300,482 | 11/1981 | Tinkham | 60/39.464 |

FOREIGN PATENT DOCUMENTS

1349090  3/1974  United Kingdom ................ 123/204

Primary Examiner—Louis J. Casaregola

[57] ABSTRACT

A combustion engine has a compressor, an expander and a combustion chamber for burning fuel in hot air. The fuel is preferred to be a prepared block of powdered, cleaned and compressed coal. The fuel blocks may consist of cleaned powder of coal which is after cleaning pressed to conveniently sized blocks of high density. The coal fuel blocks will then have a density much higher than the density of coal powder, whereby a high amount of heat value in the coal fuel blocks can be provided for use in a convenient fuel container. A transportation means is provided to transport the respective fuel block to a cutter or powderization device for re-transformation of the solid fuel blocks into fast burning small powder-like particles. The so repowdered coal fuel burns in the combustion chamber whereby the expander is driven, which drives the compressor and supplies the power out of the engine. One of the major features of the engine is, that the available coal requires only little preparation to be burned in the engine and the high-cost liquidification of coal into gasoline-like fuel can be spared. To prevent incomplete combustion which would occur if prefect mixing of fuel with air would not be secured, means are provided to supply respective amounts of fuel at respective times to respective local places of respective amounts of hot air.

5 Claims, 4 Drawing Sheets

Fig. 8

COMBUSTION ENGINE FOR SOLID BLOCK FUEL

BACKGROUND OF THE INVENTION

The common combustion engine burns gaseous or liquid fluids in the compressed air. In the near past the fuel fluids, especially gasoline and keroseen, have become rare and expensive. To prevent the extinction of available fuel, great efforts and investments are planned to transform natural coal into liquid fuel or gaseous fuel. The transformation process to change natural coal into useable liquid or gaseous engine fuel requires high amounts of energy for processing. About two thirds to three fourth of the available amount of coal is commonly required for the processing, while the rest of only one fourth to one third of the utilized amount of coal becomes a gasoline, kerosene or other liquid-or gaseous-fuel.

While the liquidifaction of natural coal into liquid-fuel itself is rather economical, the processing wastes more energy than liquidified energy is obtained.

The natural amount of coal available in the resources of the earth would last two to three times longer and the costs of preparation of fuel from natural coal would be drastically less expensive, when solid blocks of coal fuel could be used in a combustion engine.

DESCRIPTION OF THE PRIOR ART:

When my original grant parental patent application Ser. No. 224,772 was filed in January of 1981, I was not aware of the stand of the former art. In the meanwhile, however, I have obtained after a trip to Europe a copy of the very important report of Soehngen and associates about "Development of coal burning Diesel engines in Germany" which was published in 1976 by the U.S. Department of Commerce and whereof copies can be obtained from the National Technical information Service, U.S. Department of Commerce, Springfield, Virginia, 22161.

During examination of my mentioned grand parental application I have become aware of U.S. Pat. No. 4,300,482 of Tinkham, which published later than my parental application was filed and which is therefore not public former art. However, it is of interest, because it shows what is considered important at the present time. The mentioned report of E. E. Soehngen of Soehngen and associates is very interesting and very important. Because it reports about matters, which were highly successful, but which are rarely known today. It brings detailed technological results of intensive building and research of coal powder burning Diesel engines. It further mentions hundreds of patents and other publications of the first half of our century.

The mentioned Tinkham patent No. 4,300,482 provides a fuel carburator, which powderizes a coal cake inside of the carburator. The patent however fails to mention the Soehngen report and might therefore not have been aware of the problems, which such a carburator might encounter.

The Soehngen report clearly shows that the wear of the walls of the cylinders was at least partially due to uncomplete combustion which resulted in remainders of coal and minerals which then caused the wear off of the pistons and cylinder walls. Soehngen further reports, that one of the major problems of the coal powder burning Diesel engines was the difficulty to inject the coal powder properly.

My parental application has—not knowing of the Soehngen report—already clearly shown, that a means must be provided to send definite quantities of fuel powder into the respective combustion chamber.

The present continuation in part application now improves the means for proper supply of definite amounts of solid fuel into the respective combustion chamber. Thereby the invention tends to obtain a more complete combustion. The more complete combustion will—as hoped for—result in reduction of wear between the pistons and the cylinder walls of the expander and will further—as again is hoped for result in reduction of poisenous exhaust gases and thereby safeguard the environment from dust and dirt.

The main object of the parental application, to locate highly compressed cleaned coal bars in the fuel container in order to obtain a higher milage of a full tank in a car than would be possible with gasoline or kerosene engines, is maintained in the present continuation in part application.

The details of the invention will become apparent from the study of the specification and of the Figures thereof.

SUMMARY OF THE INVENTION

The main object of the invention is to provide a combustion engine with the accesseries required to make it able to burn a powderized coal-fuel obtained from the solid fuel blocks of the fuel block container and to give a technology for the transformation of natural coal into solid fuel blocks. Such blocks can be stored in the fuel container of the engine to become re-processed in the respective accessories of the engine and thereafter to be used as engine fuel for burning in the combustion chamber of the engine.

Some means and objects of the invention to materialize the main object of the invention, are; to provide:

(1) A combustion engine, comprising, in combination, at least one compressor in communication with at least one combustion chamber, the combustion chamber in communication with at least one expander, while the expander drives the compressor and has an output means for the supply of power out of the combustion engine; a fuel supplied into the combustion chamber and subjected therein to burn at least partially in the compressed hot air which flows from the compressor to and through the combustion chamber and the expander when the moveable parts of the compressor and expander move under the forces of the expanding gases in the expander;

wherein the fuel is obtained from a rigid solid fuel block of longitudinally straight configuration which is storaged in a fuel container and transferred from the fuel container to a smasher device which powderizes said fuel of the fuel block in a continous operation of pulverization of portions of the fuel block,     wherein a fuel supply arrangement is provided separately of the smasher device and connected to a moving member of the engine to operate with a speed, which is parallel to the speed of the moveable member at a rate of flow of the fuel supply member of the fuel supply arrangement;

wherein the rate of flow supply member forces in a rate, which is proportionate to the rate of flow of air from the compressor into the combustion chamber, respective portions of the powderized fuel from the smasher device into the hot air in the combustion chamber;

or;

(2) The engine of 1, wherein the rate of flow supply member is a piston which reciprocates in a fuel supply cylinder parallel to the movement of a moveable member of the compressor;

or;

(3) The engine of 1, wherein the fuel blocks are compressed from cleaned coal powder to a density which exceeds the density of natural coal (4) The engine of 1, wherein the fuel is compressed to blocks of high density and to a form suitable to be transferred from the container to the smasher device;

or:

(5) The engine of 3 and 4, wherein the fuel is produced from natural coal by powderization of the natural coal, cleaning and separation of the natural coal from non-coal particles and compression of the coal after the cleaning and separation to the blocks;

or;

(6) The engine of 1, wherein the smasher device is driven by the combustion engine, the transfer of said fuel blocs from the storage to the smasher device is provided by a block transporter which is associated to the container and the blocks;

or:

(7) The engine of 1, wherein a fuel injector is associated to the combustion chamber and to the fuel to inject respective portions of the fuel into the combustion chamber in suitably timed relation and quantities to effect an effective burning in the combustion chamber after the portions of fuel were smashed and powdered in the smasher device;

or:

(8) The engine of 1, wherein the combustion chamber is provided with a cleaning and separation means to separate remaining uncompletely burned particles from the the fluid stream through the combustion chamber into the expander;

or:

(9) The engine of 5, wherein the blocks are compressed to a density exceeding 1.5 kilograms per cubicdecimeter and thereby containing a heat value exceeding 10,000 kilocalories per cubicdecimeter;

or:

(10) The engine of 1, wherein a plurality of compressor chambers supply in timed succession compressed air into a common combustion chamber, while the common combustion chamber supplies portions of heated gases in timed succession into a plurality of expansion chambers;

or:

(11) The engine of 1, wherein the smasher device smashes the fuel blocks to coal-powder, a fluidization arrangement mixes said coal powder with fluid to a fuel-fluid-powder-mixture and includes a pump means to force the mixture into the combustion chamber in proper force, direction and quantity to effect the effective burning of the mixture in the combustion chamber;

or;

(12) The engine of 1, wherein the engine is incorporated into a machine which might be a vehicle and the container, fuel blocks, smasher and associated means are provided and properly located in the machine.

More aims and objects of the invention may become apparent from the Figures, the description of the preferred embodiments or from the claims. The claims are considered to form portions of the disclosure and description of the present invention.

Another object of the invention is, to provide a solid fuel which has more heat value per unit of volume than the unit of volume of gasoline or kerosene would have, whereby a further object of the invention becomes realized, namely to provide an engine for a car, truck tractor or train, which can with a given size of a filled fuel tank drive farther with more milage per tank than the usual gasoline or kerosene driven vehicle could obtain with the equal volume of the fuel tank of the vehicle.

While it thereby was an object of my parental application and remains an object of the present application to provide a solid and inexpensive fuel of a superior heat content per unit of volume and to transform the solid block or bar into suitable powder before it enters into the combustion chamber, an additional important object of the invention is to transform the solid block outside of the combustion chamber into such burnable fuel and to supply it in such defined quantities and times to the combustion chamber, that an almost complete and perfect combustion can be obtained and thereby wearing of pistons and cylinder walls can be reduced, while at the same time poisenous or dirty exhaust gases are at least partially eliminated by the preparation of the fuel blocks and by the provision of the more complete combustion in the combustion chamber.

To obtain this object, the arrangements are provided in the device of the invention, which will be shown and explained in the Figures and in the description of the preferred embodiments.

They will also be defined in the claims and the claims are thereby considered to be portions of the disclosure of the present invention.

DISCUSSION OF BASIC TECHNOLOGIES:

A combustion engine which has a combustion chamber between a compressor and an expander has at least one moveable member in the compressor and in the expander. The mentioned members are mounted together directly or indirectly to more relative to each other in a defined ratio of speeds of the moveable members. For example, in the compressor and the expander reciprocable pistons may move and be combined together by connecting rods and a crankshaft to reciprocate in a ratio of speed. The ratio may be variable or permanent and the ratio may also follow a timed variation respective to the crankshaft. If the engine is a rotary engine, vanes or a trochoidal rotor may reciprocate in slots in a rotor or revolve in a housing and the rotors may be combined over bearings and cams or over a common shaft. If the engine is a turbine engine the compressor may have a revolvable set of compressor blades, the turbine may have a revolvable set of turbine blades and the rotors which carry the mentioned blades may be combined together by a common shaft which revolves with the rotors of the compressor and expander = turbine stage of the engine. The movable members which are discussed in this application correspond to such members and the ratios of speed to the common coupling device between compressor and rotor.

Fuel is a matter which burns in air or in oxygen. Every fuel has a specific "heating value" or "content of internal energy," which is expressed in Kg per CC (with CC=cubiccentimeter) or per unit of weight. It can also be expressed in BTU per lbs. of weight. An amount of fuel can burn completely in a specific amount of air. This specific amount of air which is needed to burn a respective amount of fuel completely, is called "the air-fuel value" and hereafter expressed by "lambida=1". If the air supplied to the fuel is too less for complete combustion of the fuel, so that the fuel can not completely burn in the amount of air, then the air-fuel ratio "lambida" is smaller than 1.0. If the amount of air supplied is too much for the amount of fuel, then the air-fuel value lambida is greater than "lombda=1.0". Higher values than lambida=1.0 give good efficiencies to the engine. The value "lambida=1.0" gives the biggest power to the engine, and smaller values than "lambida=1.0" give unperfect combustion with resulting poisenous exhausts. A rate of speed compared to another rate of speed gives a ratio. More details of such basic technologies may be obtained from the book "Steam, Air and Gas Power" written by Severns, Degler and Miles and published by Wiley and Tuttle of N.Y. and Tokyo.

The air-fuel ration "lambida=1.0" for carbon requires 11.5 lbs. of dry standard air for 1 lb. of carbon and obtains at this ratio 11.5 to 1.0 the mentioned complete combustion of the carbon fuel in the air with h=1.0.

The air-fuel ratio "lambida=1.0" for average gasoline requires 15.13 lbs. of dry standard air for one lb. of gasoline and obtains at this ratio 15.13 to 1.0 the mentioned complete combustion of the gasoline in the air. These values are taken from the mentioned book 5th modern Asia edition, pages 113 and 114.

Considering the specific weight of dry standard air, the above values transform as follows:

The amount of air for air-fuel ration lambida=1 to burn 1 lb. of carbon is 4.26 cubicmeter of air and the amount of air for air-fuel ratio lambida=1 to burn 1 lb. of gasoline is 5.6 cubicmeter of air (with specific weight of air=1.226 Kg per cubicmeter and 1 lb=0.454 kilogram.)

The mentioned "heating value" of carbon is 8093 Kcal per Kg, 3674 Kcal per lb, or 14580 BTU per lb. The heating value of dry Colorado Anthracite is 14490 BTU per lb. (taken from the mentioned book, page 91) or it is 8037 Kcal/Kg. The heating value of average gasoline is about 19000 BTU/lb and average gasoline has a specific weight of about 0.78/CC (with CC again cubiccentimeter and with 0.78=gram.) The specific weight of carbon is about 1.8 to 3.5 gram per CC and the specific weight of average anthracite is about 1.52 gram/CC.

CONSIDERATIONS BY THE PRESENT INVENTION:

It is possible to cut, for example, a block of the mentioned dry Colorado Anthracite into long bars of square sectional configuration, with, f.e., 1 cm width (breadth and hight). One centimeter length of such bar then has 1 CC volume, a weight of about 1.52 gram and a heating value of 8037/1000=8.037×1.52=12.21 Kcal. Compared thereto an equal volume of 1 CC average gasoline has a heating value of 19000 BTU/lb×0.252 =4788 Kcal/lb /0.454=10546 Kcal/Kg=10.540 Kcal/gram×0.78(specific weight)=8.226 Kcal/CC.

In other words, the heat content of 1 CC of dry Colorado Anthracite is 12.21/8.226=1.48 times higher than the heating value of 1 CC of average gasoline.

Thereby the invention finds, that a car with a given volume of a fuel tank would run 1.48 times farther (give 1.48 times more milage with the same volume of the fuel tank) if the fuel tank would not contain gasoline, but dry Colorado Anthracite instead, and if the Colorado Anthracite could be transformed into burnable fuel and be transported in the correct air-fuel ratio to the combustion chamber of the engine of the car.

This result may be still further improved for an even better milage, if anthracite or coal would by a preparation become freed of other contents than carbon, and thereafter be pressed to the density of carbon for obtaining the specific weight of carbon. Note that coal can be milled to powder and then become centrifuged to send all non-carbon portions out of the centrically remaining carbon, that the in the middle of the centrifuge remaining carbon can be taken out of the centrifuge and be given under a heavy press to become compressed to the density and specific gravity of solid carbon.

THE SPEED RATIO OF THE INVENTION:

From the above considerations it can become calculated with which speed a fuel bar of the invention would have to be moved towards the combustion chamber of the engine. Considering an engine of one liter=1000 CC volume, and a fuel bar of Calorado Anthracite cut to square-section of 1 cm×1 cm cross sectional area, one obtains for a two stroke engine with 6000 rpm=100 ups an air volume of 100000 CC per second flowing into the cylinder of the engine. That gives 100000 CC=0.1 cubicmeter of air per second. Since the heat value of Colorada Anthracite differs from the heat value of carbon by only 8037 to 8093 and since the air-fuel ratio of carbon is (according to the earlier findings) 4.26 cubicmeter of air for 1 pound of carbon or 4.26/0.454=9.38 cubicmeter of air for lombda=1.0 for 1 Kg of carbon, it can be assumed that the air-fuel ratio for lambida=1.0 for Colorado Anthracite is substantially equal to that of carbon. The 100000 CC=0.1 cubicmeter of air per second in the cylinder of the engine then require 1 Kg×0.1/9.38=0.01 Kg of dry Colorado Anthracite or 0.01 kg/1.52=0.00701 cubicdecimeter of dry Colorado Anthracite=7.01 CC of dry Colorado Anthracite.

Since the described solid dry Colorado Anthracite block bar has a volume of 1 CC per centimeter of length, it has to advance towards the cylinder of the engine with 7.01 centimeter per second to effect an air-fuel ratio of lombda=1.0 at the combustion in the mentioned cylinder at the mentioned 6000 rpm of the engine. For a higher than 1.0 lambida air-fuel ratio it has to advance with 7.01/lombda. For different revolutions of the engine it has to advance with the above speed multiplied by the actual revolutions of the engine in rpm divided by 6000.

At the so obtained lambida=1.0 air-fuel ratio the engine obtains its highest power output. At a higher than 1.0 lambida ratio it obtains a better efficiency and at a lower, than 1.0 lambida air-fuel ratio it runs with unperfect combustion and poisenous exhausts.

DEFINITIONS FOR THIS INVENTION:

A solid fuer block bar is a rigid, non-powdered, not deformably week and not semi fluid bar of a substantially straight configuration, because it is named a "bar". The adjective "solid" excludes semifluid cakes and powdered or liquided fuel. Such a bar is bordered by a longitudinal outer face or a plurality of such faces with the outer face or faces formed by neighboring longitudinally straight lines. Thereby it can be a round circular longitudinal bar of a circular outer face or the outer face can form a multiangluar outer face of a plurality of straight faces. Thus, the term "longitudinal straight fuel block bar with longitudinally straight outer face portions" includes circular round bars, bars of squared cross-sectional area, bars of rectangular cross-sectional area, of hexagonal cross-sectional area and all other kind of longitudinally straight bars whereof the longitudinally directed outer face remains locally straight throughout the entire longitudinal length and surrounds at the entire longitudinal length an equally formed and dimensioned cross-sectional area.

An "average proportionate to the speed of expansion and contraction of the combustion chamber of the engine moving member of the engine" is commonly in piston engines the crankshaft or any member which moves substantially proportionate to the crankshaft. But it is the rotor of a rotary engine or a turbine shaft of a turbo engine with any member included which moves substantially proportionate to the mentioned rotor or turbine shaft. The adjective "average" is used in this definition, since a piston in a cylinder, when controlled by a crankshaft, as in common piston engines, moves not with equal speed per revolution relative to the cylinder but varies its speed continually around a medial speed which is here defined by the mentioned adjective "average".

This present invention does not claim a novelty for cutting a cake or semifluid fuel into small portions, but it claims as novel the provision of the solid fuel bar for use as fuel for driving an engine as a fuel in the tank or fuel container of the plant or vehicle.

As far as terms as "gear" or "transmission" are used in this application, they define any type of known gears or tranmissions of mechanical action, fluid power action, electric action or the like, if not specificly otherwise defined. Since the details of such known gears and transmissions are obtainable from the publicly available handbooks and service manuals, such gears or transmissions are not illustrated in the present patent application. The term "rigid" is used in accordance with the Merriam Websters Dictionary as defining the quality of being stiff, strict, tense, rigorous, stringent and as lacking flexibility. The term "bar" is used in accordance with the same Dictionary as defining a long, narrow piece of material. The term "block" is used in accordance with the mentioned Dictionary as "a solid piece of substantial material (wood, stone, metal)". The term "straight" is used also in accordance with the mentioned Dictionary and defines "being free from curves, bends, angles, (in longitudinal direction) or irregularities".

USE OF FUEL BARS OF LOWER DENSITY:

Fuel bars of lower density or fuel bars of younger natural coal have a lower heat value than carbon or anthracite. The ratio of heat value relative to the heat value of pure carbon may be defined by a decimal fraction of the heat value of an equal amount of pure carbon. If then a fuel bar has a lower content of heat value, the speed of the fuel bar towards the smasher device must then be increased by the speed of a pure carbon fuel bar divided by the decimal fraction of the lower heat value of the actually used fuel bar. If the fuel bar has half the heat value relative to that of carbon, the decimal fraction is 0.50. The speed of the fuel bar must then be set to carbon fuel bar speed 0.50=2.00 times the speed of the fuel bar of pure carbon. A lower heat value fuel bar results from by pressing the coal powder with smaller force or by unperfect cleaning of the natural coal from non-carbon particles. If the reason is unperfect cleaning, the lower heat content fuel bar may or will cause wearing of pistons in the cylinders and unclean or poisenous exhausts.

ADDITIONAL EXPLANATIONS TO LANGUAGE-TERMS:

The previous examination of the language of this Patent specification has led to the assumption, that "rigid" can not mean "undeformable", since every body is deformable when subjected to high forces against it. Even that is correct, there appear to be no other suitable terms in the english language, F.e., "firm" could mean "fixed in place". "Fixed" could mean "unmoveable from the place where it is fixed". Under these circumstances, the word "rigid" as used in this specification, shall mean that the fuel bar is substantially "unflexible" and "undeformable" at the state of condition in which it is used in the device of the invention. Thus, while a solid carbon bar or anthracite bar will be deformable under pressures of several thousand atmospheres, it will not be substantially deformable laterally under the pressures of 50 to 200 atmospheres to which the bar is subjected in the device of the invention.

On the contrary thereto, a semi fluid coal powder cake has rigid particles of powder which in themselves are rigid, but one of the particles is moveable relative to a neigboring particle and thereby the semifluid cake is deformable since it consists of individual rigid particles which can move relative to each other. Thus, a semi fluid coal cake is not a rigid bar in the sence of the present application. That does, however not exclude that the word "rigid" in former art Patents is wrong, because in the former art Patents, the word "rigid" assumes the individual coal powder particles as rigid contrary to liquidious or gaseous. Since in semi fluid coal cakes or in coal powder, especially when the powder moves from a larger cross sectional area of a column through a smaller sectional area orifice, the coal powder or coal cake column is not rigid, even the indivdual particles in it as far as they consist of coal, are rigid. The column as an entire column, cake or mountain or powder, is not rigid, but deformable since the individual particles in it are not fixed relatively to each other.

Thus, rigid coal fuel cake or column differs from a rigid coal fuel bar therein, that in the column or cake, the individual particles are not fixed, but moveable relatively to neighboring particles, while in a rigid coal fuel bar or rigid carbon fuel bar the individual particles are fixed relatively to each other, which includes fixed to neighboring particles. Thus, a column or cake of coal fuel is not rigid, but a coal fuel bar is rigid and not deformable and not flexible if used in a burning place or combustion engine of pressures below about 200 atmospheres. Therefore, the word "rigid" is not singularly used in this specification, but in combination with "bar" as "rigid fuel bar".

THE RELATION OF THE INVENTION TO THE PRIOR ART:

The Tinkham Patent No. 4,300,482 which was not published and not known, when the first application of the present invention was filed, uses a means to abrasively remove particles from a fuel cake inside of a carburator to mix the abrased fuel particles with air.

The Yellot Patent No. 2,805,896 uses powdered fuel for supply to the combustion chamber to burn in the air in the combustion chamber.

And the common Diesel- or gasoline- engines supply a liquid fuel into the combustion chamber to burn in the air therein.

Common to all these known devices is, that the fuel is of less density and heat value per volume than that of carbon or than that of the best known anthracite. Consequently, the heat value of the fuel which can be contained in a fuel container of a given volume, is less than that of pure carbon or or best anthracite. As a result thereof the known engines can operate with a given volume of the fuel container only a limited time with a respective supply of power by combustion of the fuel in an engine.

It is therefore one purpose of the present invention to increase the time of the running of an engine of a given size of the fuel container.

Further, the Tinkham Patent uses a dangerous system, which tends to explosion, since it makes a combustion matter in a carburator. And the exact control of supply of quantity of fuel powder, as done in the Yellot Patent, is difficult.

Another purpose of the present invention therefore is to use a specifically formed rigid fuel bar which can be transferred towards the powdering mechanism in a very definite speed ratio relative to the supply of air and wherein the solid fuel bar is entirely surrounded along its length by a guide way which prevents mixing of the fuel bar with air to a combustion mixture. The guide way may also be formed be; the outer faces or outer face portions of adjaent, neighboring fuel bars.

Figures 1, 2:
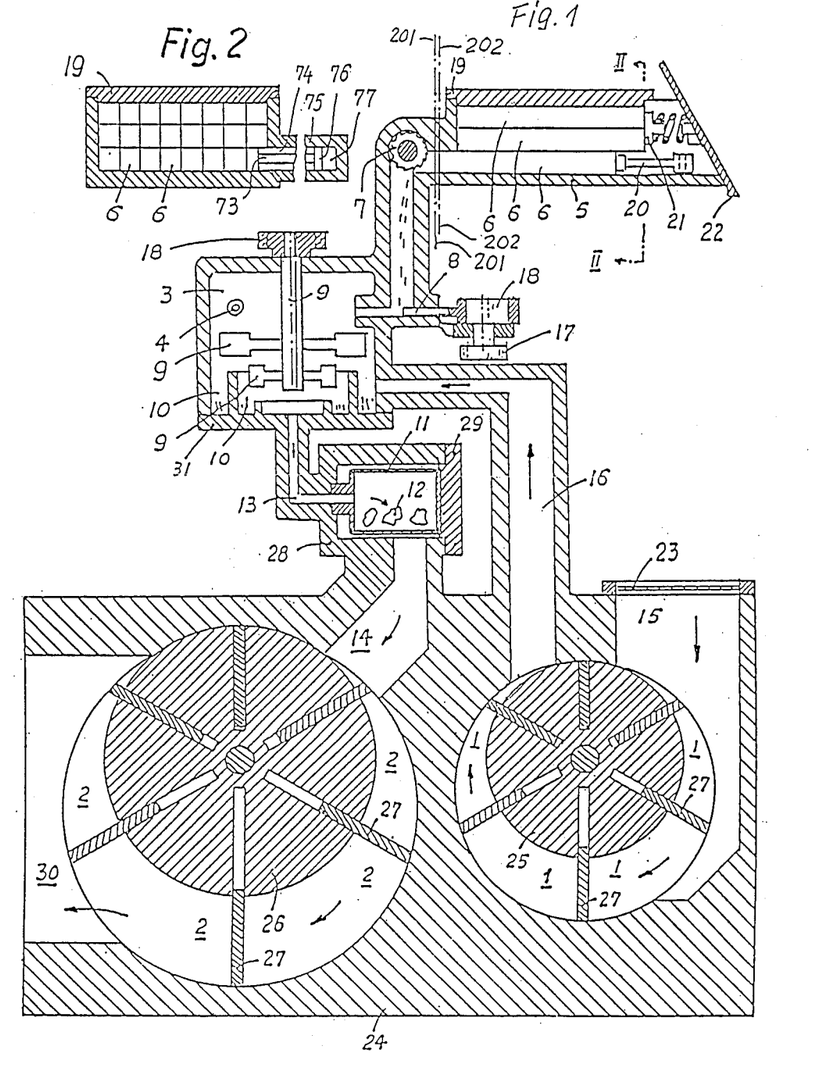
FIG. 1 is a simplified longitudinal sectional view through an embodiment of the invention.
FIG. 2 is a cross-sectional view through FIG. 1 along the line II—II.

DESCRIPTION OF THE PREFERRED EMBODIMENT:

Housing 24 is provided to compressor 1 and/or to expander 2. The chambers 1 of compressor 1 periodically increase in volume to take in the air through inlet 15 and periodically decrease in volume to compress the intaken air and to supply it through the exit 16 to the passage 16. The increase and decrease of the volumes of the chambers may become effected by pistons in cylinders or other suitable volumes varying devices, as for example a rotor 25 with vanes 27.

The mentioned pistons or rotors then form moveable members of the engine with the members moving substantially proportionate to the periodic variation of the volumes of the compression-, combustion-, or expansion chamber(s) of the engine. As far as camshafts, rotary members, oscillating members or otherwise moving members are driven with a speed in dependance on the mentioned pistons or rotors, they are also moving members of the engine which move proportionate to the mentioned periodic variation of the mentioned chambers. The most suitable of these moving members to drive fuel supply members or fuel advancement members is the crankshaft of a piston engine or the rotor of a rotary engine.

The compressed air flows from passage 16 into the combustion chamber 3. After the burning of fuel in the combustion chamber 3, the heated gas flows directly or indirectly into the entrance 14 of expander 2. The pressure of the gases in the respective chambers 2 tend to expand the respective chambers and the force of the pressure in the gases thereby increase the volumes of the respective chambers. When the chambers are cylinders, the respective pistons therein are driven downwards in the expansion stroke. When the expander is a rotor 26 in a housing or housing portion 24, the pressure in the gases act against the vanes 27 and thereby revolves the rotor 26 until the at least partially expanded gases leave the chambers 2 of the expander through the outlet or exhaust 30.

So far the basic engine is described and at least partially known from the former art. Details for the actual building of compressor, expander and associated inlets and outlets or valves are available from the respective patents granted to the applicant in the past and partially from applicant's co-pending patent applications.

What is considered to be at least partially novel, is the following:

Container 5 houses the compressed coal-fuel bars 6 of a high density. Holding arrangement 21 may hold the mentioned bars 6 in proper place. Supply arrangement 20 is provided to force at least one coal fuel bar 6 against the smashing—cutting—or powderization device 7. Device 7 may become rotated or moved by a respective gear or transmission from the expander or another moving part of the engine.

The upper right portion of FIG. 1 when seen together with its cross-sectional FIG. 2 shows, that the bars 6 may, for example, be longitudinal and have a square—or other suitable—cross-sectional configuration. A number of bars 6 can then be placed into the container 5 and be used one after the other for the transfer towards the shmasher device 7. Bars of cross-sectional configuration with right 90 degree angles are especially suitable for the most complete utilization of a respective fuel container 5. Member 22 may, for example, be the rear plate of a car. Cover 19 may be provided for the easy filling of container 5 with the respective fuel bars. The coal-fuel bars 6 may be covered, if so desired, with an outer skin for cleanliness and for the prevention of durty hands of people during loading of the container 5 or during other storage of the bars 6. The mentioned skin may also act to prevent self-ignition of the fuel bars 6.

The smasher device 7, which, for example, may be a revolving grinding or cutting wheel of suitable tool material and shape, driven by a transmission from an engine member, pulverizes the bars 6 into suitable powder. The smaller the particles, leaving the smasher device 7, are, the faster will be the combustion in the combustion chamber 3.

One or more injection members 8 or injection devices, for example, 8, 18, 17, hereafter called "injector" may be assembled to the engine for the actuation and operation of a suitably timed and volumed fuel supply into the combustion chamber 3. For example, 8 may be a piston or a plurality of pistons, which act in periodic succession. The eccentric member 18 may be driven by a gear 17 to provide the reciprocational movement of the respective piston 8.

It should, however, be understood that the injector 8 might also be a pump with permanent supply of the fuel powder under pressure. A stream of fuel powder will then be injected into the combustion chamber 3. It is not excluded and sometimes convenient, to mix the fuel powder in a pump-injector with fluid for example liquid or air or gas. The supply of fuel by the injector 8 must be suitable for a perfect burning of the fuel in the air in the combustion chamber 3.

Combustion chamber 3 may contain a rotary or other separator with blades 9. Separator 9 may be driven for example, by a gear member 18. Plural blades 9 may then drive the air-mixture in combustion chamber 3 into rotation, whereby the heavier non-pure coal particles may be forced into the radially outer regions, where they may fall down into the dirt collection spaces 10. A removeable combustion chamber cover 31 may be provided for the periodical cleaning of the dirt-collector spaces 10.

Passages 13-14 may transfer the burning gases or hot gases from the combustion chamber 3 into the expander 2. To prevent movement of dirt particles into the expander, it is preferred to set the exit of combustion chamber 3 by means of passage 13 into the center of the combustion chamber bottom of chamber 3. Because under the centrifugal forces provided by separator 9, the dirt particles are commonly radially outside in chamber 3, while the clean, lighter gases, are in the medial portion of the chamber 3 and on its bottom. An ignition means, for example, an ignition plug 4 should commonly be provided to the combustion chamber 3. In the case of permanent combustion, as preferred, the ignition plug must be used for an ignition at the start of the engine, while the ignition device 4 might be in rest during the following permanent combustion.

A filtering device 11 may be contained in housing 28 in passages 13-14 for the further cleaning of the gases which flow from chamber 3 into expander 2. Cover 29 may be provided for the easy cleaning of filtering device 11. Catalysts 12 may also be provided in chamber 18, 3 or in filter device 11 for the cleaning of the gases from poisenous gases which might otherwise pollut the athmosphere.

While FIGS. 1 and 2 show the engine in principle, it should be recognized, that the details, which are drawn in the plane of a sheet of paper, but actually are built in the three-dimensional space, are not exactly or appropriately in scale. Shown in the Figures is, however, that the expander must have a suitably bigger volume, than the compressor, because the expander has to drive the compressor and to supply an output power out of the engine.

More detail of technologies of coal burning engines may be obtained from my West German DOS-33 30589 of Mar. 14, 1985, including pressures and temperatures in the engine until my respective U.S. patent applications will be patented and published.

The arrows in FIG. 1 demonstrate the direction of the flows. Air-filter 23 may be provided before the air-intake 15.

The purpose and need for the engine of the invention is as follows:

The gasoline and keroseen resources of the earth are going to an end. Natural coal is still available in great quantities.

The heretofore used systems of attempting to build a coal-powder engine, as far as they are known to me, could not be succesfull for two major reasons:

(a) They burned powder with dirt particles in cylinders, where no suitable means for cleaning of the coal powder from the dirt were provided.

(b) The coal powder has a density of roughly only 0.6 kilogram per cubicdecimeter. That required too large containers for cars and in addition the coal powder is too dirty for handling in cars, machines or vehicles.

The compression of the coal powder to high-density bars as in the invention, eliminates the dirt at handling and reduces the size of the required space for the storage of the fuel in the container to roughly one third. One liter, where one liter means one cubibicdecimeter of 10 cm $\times$ 10 cm $\times$ 10 cm, now, according to the invention, contains roughly about 1.52 kilogram of burnable coal fuel. With a heat value of 8093 Kilocalories per kilogram of pure carbon, a liter of coal fuel of the invention will now have roughly 8093 $\times$ 1.52 = 12300 kilocalories of heat value. That means, that a car, having a container for equal liters of fuel, will be able to run 1.48 times farther, than the heretofore used conventional car with gasoline in the heretofore used tank of the car. When the density of about 1.52 Kg/liter is not fully obtained, the car will run almost as far with the fuel of the invention, as it runs in the common car with gasoline.

For the preparation of the fuel blocks, natural coal may be powderized, washed, and pre-cleaned in a larger separator, for example of the principle of chamber 3 with separators 9, 18, 10 of FIG. 1. The cleaner coal sludge or powder, obtained then from the centric portions of the larger chamber 3, may then thereafter become pressed under heavy pressure into the solid fuel block 6 of the invention.

The importance of the arrangement of the invention may be understood for example, at hand of U.S. Pat. No. 4,300,482 of Tinkham. This patent supplies a solid fuel cake into a fuel carburator Then it brushes particles away from the cake to burn them. According to the present invention, it is very difficult to maintain for considerable time a brushing mechanism in a hot combustion chamber. And, as the present invention considers, a solid fuel cake will not properly burn in a combustion chamber. Because the hot air would reach only the outer cover, the outer layers of the cake. Only the very thin film of air would meet the fuel cake. In other words, only boundary layers would react together. Thus, the main amount of compressed air would pass unused through the combustion chamber. Consequently, the present invention discovers the very important matter, that local meeting of fuel and air must be provided and secured.

That is done in the present invention by the provision of the fuel injector 8, 17, 18 of FIG. 1 because it acts in properly timed relation relative to the supply of compressed air from the compressor. It secures, that the proper amount of fuel is supplied to the combustion chamber at the proper time in relation to the supply of air from the compressor.

Figures 3, 4:
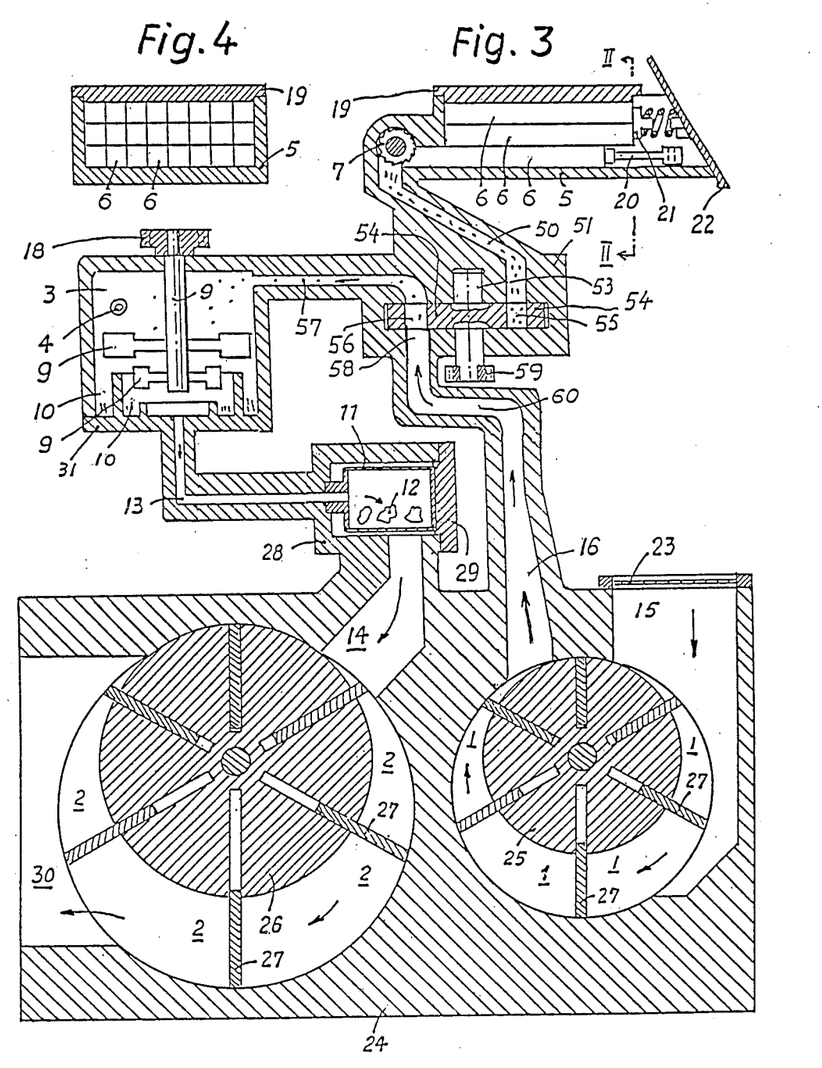
FIG. 3 is a simplified longitudinal sectional view through an alternative embodiment of the invention.
FIG. 4 is a cross-sectional view through FIG. 3 along the arrowed line II—II in FIG. 3.

Or, it is done by the provision of the fuel flow control arrangement of FIG. 3, which provides at all times a proper mixture of fuel and air at every local location and then blows it properly into the combustion chamber for burning therein.

Figures 5, 6, 7:
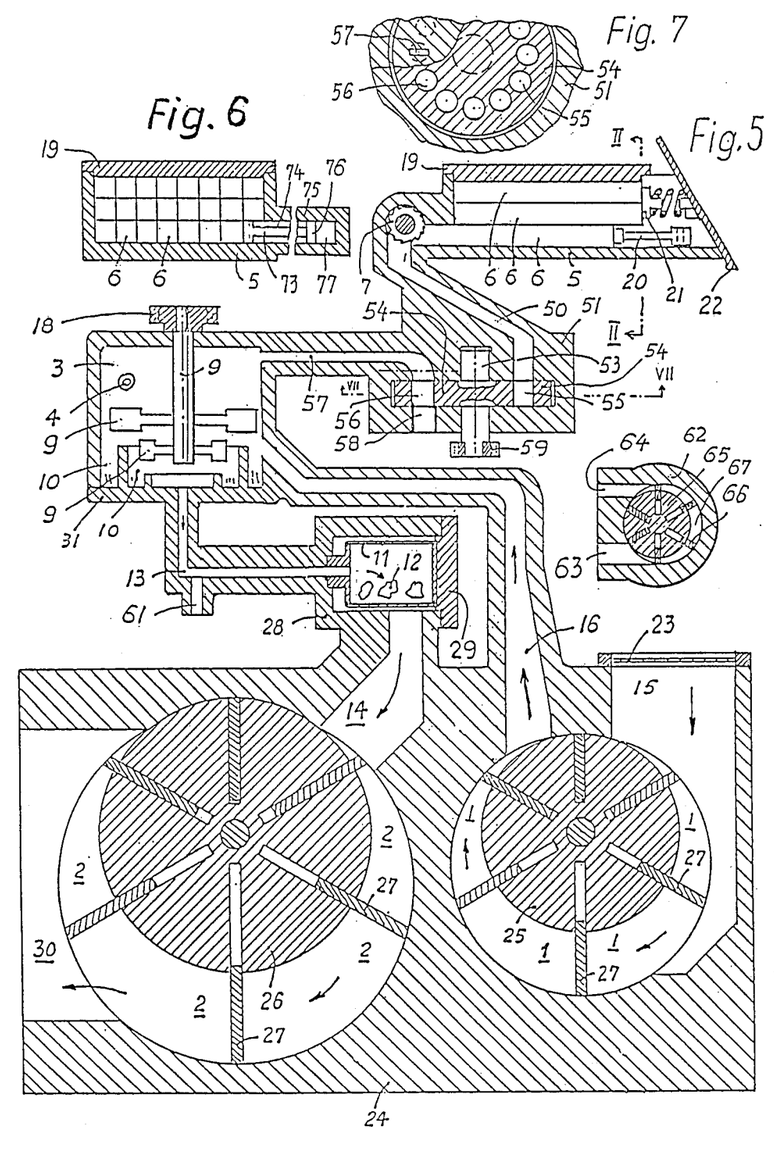
FIG. 5 is a longitudinal sectional view through another alternative of an embodiment of the invention
FIG. 6 is a cross-sectional view through FIG. 5 along the arrowed line II—II in FIG. 5.
FIG. 7 is a sectional view through FIG. 5 along the arrowed line VII—VII of FIG. 5.

Or, it is done by the fuel flow arrangement of FIG. 5, which in addition to the supply arrangements of FIGS. 1 and 3 secures, that any kind of pre-burning or pre-explosion is prevented and the combustion takes place exclusively inside of the combustion chamber.

The invention helds, that a block of fuel or a cake of fuel can never burn completely in the combustion chamber or in the furnace, because only layers of air would flow over layers and react with layers of the surface of the solid fuel. The major amount of air would thereby pass over the fuel cake without any reaction with the fuel. That is while the invention provides its specific arrangements. Differently thereto the Tinkham patent permits no proper control of the local meeting of abrased fuel particles with the respective local air and, consequently, the Tinkham patent has the equal difficulty of unperfect combustion, as the coal powder Diesel engines had, while the present invention reduces such difficulties or prevents them.

FIGS. 3 and 5 correspond fully to FIG. 1 with the exceptions, which will be described hereafter. Those parts, which are already described at FIG. 1 will not be repated at the coming description of FIGS. 3 and 5 because they are equal to those of FIG. 1. FIGS. 4 and 6 correspond fully to FIG. 2, because they are similar sections as in FIG. 1 also they are now taken through FIGS. 3 and 5. FIGS. 4 and 6 are therefore already known from the description of FIG. 2 and will not be described any more hereafter in this application.

The exceptions of FIGS. 3 and 5, which are mentioned above, are as follows:

FIG. 3 is provided with a fluid flow control device 51. Controller housing 51 is provided with a rate of flow of fuel defining element 54, which may be a plate with chambers while the plate may be subjected to a movement, but which is in FIG. 3 a rotary disc which is borne by shaft 53 in housing 51. It may be pivoted or be revolved by gear means 59. The rate of flow defining element 54 is provided with chambers 55 and 56. Shown in each one chamber 55 and 56, but it is preferred to set a great quantity, meaning a plurality of chambers, 55 or 56. From the smasher, grinder or cutter 7 the now powdered particles move through passage 50 into the respective thereto communicated chamber 55. This chamber has a specific volume to define the amount of fuel containable in this chamber. Thereby a rate of flow of fuel is established, as later will be seen. The rate of flow element 54 then moves the chamber 55 to the place, where it is shown as chamber 56. Chamber place 56 is in FIG. 3 communicated to the compressed air supply line 60, which is provided between the delivery passage 16 of the compressor 1 und the port 58 of chamber 56. The compressed air which flows now into chamber 56 blows the content of fuel which is present in chamber 56 through passage 57 into the combustion chamber 3 for the burning of the fuel in the air therein. It should now be seen, that the compressor 1 supplies specific quantities of hot compressed air towards the respective control chamber 56, while control chamber 56 contains a specific amount of fuel which can never be different in quantity of volume from the quantity of volume which the control chamber 55 or 56 has. If now the movement speed of the element 54 is set by gear 59 in proper relation to the speed of rotor 25 of compressor 1, there is a ratio of supply of fuel defined in respect to the ratio of air supplied from compressor 1. The same was done in FIG. 1 when supply control means 8 was properly connected by gear means 17 to compressor 1.

Compared to FIG. 1, however, FIG. 3 effects an immediate and proper mixing of the fuel particles with the compressed air, which arrives in chamber 56 and passage 57 from the compressor 1. If the element 54 is a rotary disc with many chambers 55 or 56—the chambers are equal, but have different referential numbers 55 and 56 to show their different functions of receiving and exhausting fuel at different locations-, the chamber 56 will meet first only a portion of the port 58, later meet the entire cross sectional area of port 58 and thereafter meet again only a portion of port 58 until it finally entirely leaves the communication with port 58. Thus, the compressed air can never blow all of the fuel out of chamber 56 in a small moment but, on the contrary, the fuel is blown out of chamber 56 gradually. By utilizing this arrangement of FIG. 3 it is possible to provide many small chambers 55, 56 in the element 54 and to communicate them respectively rapidly alternating with passage 50 and passages 60, 57 in order to obtain in practice a permanent flow of a definite rate of flow of compressed air combined with a defininte rate of flow of powdered fuel.

The effect of the arrangement is, that the problem of the coal burning Diesel engines which was not able to mix the entire space in the combustion chamber properly with locally equal ratios of fuel and air, is now overcome by the present invention. Because at all times will the local place in passage 57 be filled with the same flow of the same ratio of rate of fuel to rate of air. Regardless what size and configuration the combustion chamber may have, it will never receive ununiform mixture of fuel and air which departs from the defined specific ratio of flow of fuel and of air in the supply passage 57 of FIG. 3. The locally equal mixture of the defined rate of fuel to air now provides the complete and perfect combustion which prevents wearing of cylinder walls and which reduces the contet of poisenous gases in the exhaust, while at the same time it increases the efficiency of combustion and thereby of the furnace or of the engine.

FIG. 5 uses the same fuel flow control arrangement as FIG. 3 does. However, it does not lead the compressed air from compressor 1 to the control chamber 56. But instead it leads the compressed air to the combustion chamber 3 substantially in the same way as FIG. 1 does. The specifity of FIG. 5 consists therein, that the passage 13 between the combustion chamber and the expander which contains the heated gas after burning of the fuel, in air, or any other place which contains such gas, or the exhaust passage 30 of expander 2 is provided with a take off port 61. Take off port 61 is communicated to the entrance port 63 of an assessory compressor 62. Non-burnable gas is thereby supplied to compressor 62. Instead of taking such non-burnable gas from the engine, it might also be taken from a supply container. However, to take it from the burned gas of the device in an inexpensive way to take it and the gas taken from the places of the device as defined is a non burnable gas because the fuel was already burned in the air and there remains no burnable matter in the so taken gas. Compressor 62 has means 65, 66 to compress the already dense or non compressed non burnable gas to a high pressure. This high pressure will be higher than the pressure in the combustion chamber 3 is. The outlet port 64 of compressor 62 is communicated by a passage to port 58 of the already described control chamber 56. The passages between ports 61 and 63 and between ports 64 and 58 are not shown in the Figure, because there is no space to draw them and because in the plane of the paper one of the passages would cross passage 16, which is not permitted as communication and can not be drawn in the plane of a sheet of paper.

The functioning of the arrangement of FIG. 5 is, that fuel particles are supplied into chamber 55 as in FIG. 3. However, instead of leading compressed air through control chamber 56 there is now in FIG. 5 a non-burnable compressed gas blown through chamber 56. This non-burnable gas blows the fuel particles of chamber 56 through passage 57 into the combustion chamber 3. Again there is now provided a definite ratio of rate of flow of air into the combustion chamber 3 in relation to a definite rate of flow of fuel particles into the combustion chamber 3. The gear 59 is again connected to rotor 25 of compressor 1.

The arrangement of FIG. 5 prevents any early start of combustion of the fuel in air in chamber 56 or in passage 57. Thereby explosions are prevented inside of chamber 56 and passage 57.

Whether to apply the arrangement of FIG. 3 or that of FIG. 5 depends on the aim one intends to obtain. Is explosion-like supply through passage 57 wanted, or is there no danger of explosion in chamber and passage 56 and 57, then the arrangement of FIG. 3 may be preferred. If however the burning is to be accomplished exclusively in the combustion chamber 3, the arrangement of FIG. 5 may be preferred.

In accordance with the invention it may also be recognized that coal powder tends to explode when storaged. Such explosions which caused death and injury to persons in the first half of our century is prevented by the present invention, because it uses exclusively highly compressed fuel blocks or fuel bars which are not explosive. It reforms them to power at a location where the fuel is not subjected to hot compressed air and where fuel explosions are therefore impossible.

The fuel container 5 may also be provided with a lateral transportation device for the fuel blocks 6 as indicated in FIGS. 2 and 6. A thrust member 73 is mounted in a housing 75 of, for example, a cylinder 77 to press against the respective fuel bar block. The block are bars since they are longitudinally straight. The thrust body 73 may be provided with a piston 76 and timing devices, not shown, may be added to press a respective bar 6 by the thruster 73 into position before the thruster 20 of FIGS. 1 and 5 when the previous bar 6 is used up in the powderization device. Such arrangements may also be provided to FIGS. 3 and 4.

FIG. 7, which is the sectional view through FIG. 5 along the arrowed line VII—VII of FIG. 5, illustrates that the revolvable metering wheel 54 has individual metering chambers 55, which at the location 56 are subjectable to the flow of thrusting fluid from passage 58. The upper left portion of FIG. 7 is taken as a sectional view along the point-dotted line above the line VII-VII in order to indicate that the transfer passage 57 may have a nozzle port 157 adjacent the respective metering chamber 56 in order to restrict the cross sectional area for the prevention of too large a flow of quantities of powderized fuel through the metering nozzle 157.

Individual metering chambers are, for example, known from FIG. 1 of the Allen patent No. 2,923,575. The metering wheel of that patent, however, takes in powder under the weight of the powder. Such a system is not suitable for engines of the invention because the engine of the invention shall obtain a complete combustion of fuel in the hot air at every local location. For that purpose it is required to materialize a spray of the individual powder particles of the fuel under the force of the flow of thrusting fluid from passage 58 into all respective local places of the combustion chamber because otherwise the perfect local mixing of hot air and fuel would not be secured and unperfect combustion with poisenous exhaust would locally appear in the combustion chamber.

A specific feature of the present invention is that it overcomes the unsuitable designs and partially dangerous systems of the past and also that it overcome the errenous considerations of the present time when this invention was made. In the former art, for example of the Allen patent, the powder was storaged above the metering wheel. Coal powder contains air and is highly explosive, partially exploding at the bottom portions under compression of air under the weight of the upper layers of the coal powder of storage tanks. The Allen device has no means to prevent entering of the burning flame from the combustion chamber through the metering wheel into the storage tank to explode the coal powder therein. It has also no provisions to secure the spray of the powder particles to every local place in the combustion chamber uniformly for local perfect combustion. Consequently, it burns uncomplete and provides poisenous exhausts.

At the time when the present invention was made it was assumed that abrasing fuel from a fuel cake would be a patentable invention as the grant of the Tinkham patent certifies. That consideration, however, overlooks the dangers which are provided in the Tinkham patent. In the Tinkham device the air flows over the coal cake at the time of abrasion of the coal cake. That provides an immediately explosive fuel-air mixture which can explode itself by self ingnition. In addition, the Tinkham device has not provision to prevent extension of the flame of the combustion chamber into the abrasing and mixing fuel carburator of the device whereby the Tinham arrangement is an extremely dangerous apparatus which might explode itselves.

On the contrary thereto, the present invention storages longitudinally straight fuel bars of a density which exceeds that of natural coal in a fuel container which leaves no air along the fuel bar blocks. Every self explosion is thereby effectively prevented. The smasher device is provided in such a way that no air can enter it and, consequently, also the smasher device of the invention is prevented from self-explosion. Air can earliest enter the device at the fuel metering and supply arrangement. This arrangement, however, is in the present invention self-metering for small amounts of fuel, whereby only very limited amounts can burn. Such limited amounts of burning fuel can never provide an explosion of the engine or its parts. The metering system of the invention further secures a perfect mixing of the fuel in the combustion chamber with the respective amounts of air in the combustion chamber for perfect and complete combustion at all local places inside of the combustion chamber. The freeing of the stored fuel from neighboring air is obtained by the provision of the straight fuel bars. A straight fuel bar has a straight longitudinal axis where around a constant cross sectional area is uniformly formed along the entire length of the fuel bar. The outer face of the fuel bar is thereby formed by a plurality of neighboring longitudinally straight lines to form at least one longitudinally straight outer face of the fuel bar. The bar has one outer face if the cross sectional area is that of a circle and it has plural plane faces which meet in corners if the cross sectional area of the fuer bar is a square, a rectangle or a multiangular configuration. The mentioned straight face or faces secure or make it possible that the bars meet directly in the storage container without explosion enabling air between them.

Figure 8:
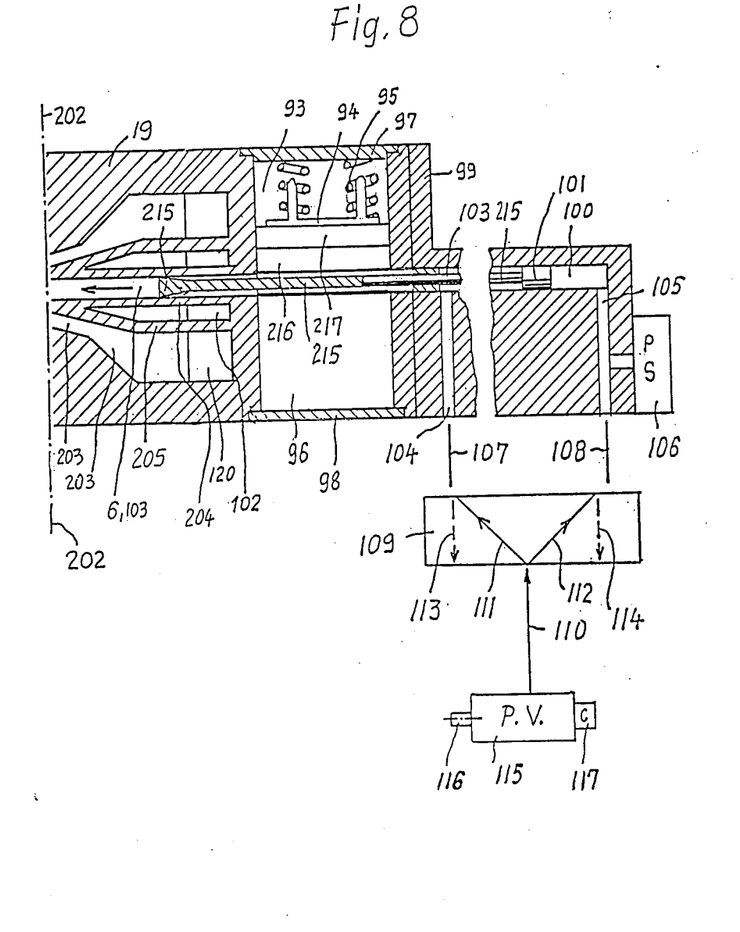
FIG. 8 is a sectional view through an adapter to FIG. 1.

FIG. 8 is a sectional view through an adapter to FIG. 1.

In FIG. 1 two parallel point-dotted lines 201 and 202 indicate with the space left between them, that either the portion on the right of line 202 is assembled on FIG. 1 or, alternatively, the adapter of FIG. 8 becomes assembled to the right of line 202 onto the engine of FIG. 1. FIG. 8 is drawn in an enlarged scale relative to FIG. 1.

Spaces 102, 120 and 203 may be used to contain cooling fluid because they are in the neighborhood of the hot combustion chamber 3. Wall 205 may separate spaces 102, 120 or 203.

FIG. 8 contains in its left portion a repetition of FIG. 1. A description of this portion is spared now because it is already known from the description of FIG. 1. In the portion of FIG. 8 which is not present in FIG. 1, the referential numbers 102 and 120 are passages for communications of the chamber portions of an engine, i.e., that of FIG. 1. Added in the right portion of FIG. 8 is the fuel bar container tank or space 93 and the drive arrangement 100, 101, 103, 104, 104 with its accessories for the forward drive of the respective fuel bar towards the smasher device 7.

The fuel bar tank 93 is provided with a removeable cover 97 for the entering of the fuel bars 6,216,217 into the tank 93. Below the tank may be a storage chamber 96 with a respective removable cover 98 provided. Spring means 95 may be added to the first thruster 94 with, this first thruster provided in tank 93 to thrust against the fuel bar 6 in one direction. The second thruster 215 is the thrust member 215 of FIG. 8. In FIG. 8 it is now illustrated that the thrust member 215 extends below the fuel bars 216, 217 into a thrust chamber 100. In this Figure the thrust chamber is a cylinder with front and rear portions 100 and 103 endwards of a piston 101 on the rear end of the second thruster or thrust member 215. Passages 104 and 105 lead to the thrust chamber portions 100 and 103 respectively. A pump or compressor 115 is connected with its shaft 116 to the crankshaft or to another rotary member of the engine. The pump 115 supplies a flow of fluid through line 110 over a directional control valve 109 alternatingly over line 107 and 108 into the respective thrust chamber portion 100 or 103. The pump 115, called "variable pump", "V.P." may be provided with a controller "C"=117 for the control of the rate of flow per revolution of the pump. A pressure responsive valve or pressure sensor 106 may be connected to at least one of the fluid passages 104 and/or 105. If the rear piston 101 of thrust member 15 is moved into the end position in one of the thrust chamber portions 100 or 103 the pressure in the respective portion increases and causes the directional control valve 109 to reverse the direction of flow through valve 109 from line 110 into line 107 or alternatively vice versa from line 110 into line 108. Thereby the thrust member 215 is moved either in the one or in the other direction for either thrusting a respective fuel bar 6 towards the smasher 7 or to retract into chamber 100, 103. In the rearmost location the thrust member 215 has fully left the tank 93 and the next fuel bar 216 or 217 is pressed into position before thrust member by springs 95 and the first thruster 94 or is by the own weight of the fuel bar moved into position before the thrust member 215. Thereafter the controller 109 directs the fluid flow from line 110 to flow through line and passage 108, 105 into thrust chamber portion 100 to begin the thrust of the new fuel bar 16, 17 into guide way 204 and towards the smasher 7. Parallel thereto but in timely different sequences, the other fuel bars of FIGS. 3 to 5 may be moved towards their location before thruster 215 in the same manner as shown in FIG. 8. While a fluid drive arrangement is shown in FIG. 8, it should be understood that also a mechanical electric of pneumatic drive means my be applied if the same aim is obtained as FIG. 8 obtains it. This arrangement is partially contained in housing portion 99.

For a better understanding the following matters of geometry, physics and technology are here memorized:

A body bordered by straight faces has an outer face or outer faces which is or which are formed by neighboring straight lines. Such a body is either a round bar with a stright axis and a cylindrical outer face with an equal radius around the axis, or it is a body which is formed by a plurality of straight faces which meet in corners. In the latter case the bar has a cross sectional configuration of a triangle, of a square, of a rectangle of of a polygon, like hexagon and so on. In all cases the straight faces are parallel to an axis which goes longitudinally through the body. This is important in respect to the guide way 204 of the present invention because the guide way must be formed complementary in cross section to the cross section of the body of the fuel bar, because the fuel bar should fit closely in the guide way 204 but remain axially moveable in guide way 204. Preferred are square or rectangle fuel bars and guide ways 204 and they may be formed by adjacent fuel bars. Since it is clear from the explanation that many cross sectional configurations of fuel bars and guide ways are possible and suitable, a superior term for the many possible configurations has to be used and this superior term which includes all these possibilities is hereafter called "a body which has at least one straight face or exclusively longitudinally straight outer faces, parallel to the axis of the body.

A rigid solid fuel bar differs from a semi fluid fuel column and from a fuel cake in that the bar does not fall apart into powder when it is dried, but remains at all times rigidly solid in its original configuration until it is burned or burns in the air in the burning place of the combustion chamber. Such rigid solid fuel bar is pressed of solid fuel, like coal and has a density of at least the specific density of natural heavy coal or anthracite. In practical application of the invention the coal is cleaned, powdered and pressed to a rigid solid fuel bar with a density which exceeds slightly the density of natural coal because natural coal includes air or gas which is removed from the fuel bar of the invention at the preparation process of the fuel bar of the invention.

The air-fuel ratio is known from the combustion engine technology. Fuel requires a specific amount of air for a complete combustion in the air. This air-fuel ratio is called the air-fuel ratio "$\lambda=1$" lambida=1). if the amounts of air and fuel are just in the correct ratio for the complete combustion. If the amount of air is greater than required for the combustion of the amount of fuel, the air-fuel ratio exceeds the value "$\lambda=1$" and if the amount of air is too small for a complete combustion of the respective amount of fuel, the ratio is smaller than "$\lambda=1$". The ratio 1.0 is often called: "$\lambda=1$".

If the fuel-air ratio is $\lambda=1$, the engine obtains the greatest possible power. However, if the air-fuel ratio exceeds $\lambda=1$, the thermal efficiency of the engine increases. For good and perfect combustion the engine should never be run with an air to fuel ratio smaller than "$\lambda=1.0$".

The air-fuel ratio $\lambda=1$ is obtainable from the respective literature for the respective fuels.

It is now preferred to make the fuel bar advancement variable, in order to be able to manage a desired air to fuel ratio in the engine or to vary a previously set air to fuel ratio in the engine. In FIG. 8 that is obtained by making the pump 115 variable by the rate of flow controller 117. The amount of air which is supplied by the engine per each revolution of the crankshaft is knwon from the volumes of the cylinders. This defines a specific amount of fuel to be supplied by pump 110 at each revolution for an air-fuel ratio $\lambda=1$. If now the engine shall run with a higher air to fuel ratio the delivery quantity or rate of flow supply per revolution of pump 115 should become respectively reduced. This reduction of rate of flow from fuel pump 115 is done by the controller 117 in order to obtain the higher air to fuel ratio in the engine.

With the above explanations, which are commonly known to every educated engineer, the following features of the engine of the invention will be understood:

(a) The engine uses a fuel of higher specific density than that of gasoline, fuel cakes or semi fluid slurries, whereby it storages more energy per given space of tank than the engines of the former art and can drive a vehicle farther or supply energy longer, and;

(b) The engine obtains a perfect combustion with little poisenous gases because it prevents the uncomplete local mixing of fuel and air which is unavoidable in gasoline engines, semi fluid or fluid cake engines, since in the present new engine of the invention the fuel bar remains rigidly solid until its respective upper layer of the fuel bar tip is burned in the air. Departure of small powder, slurry or gasoline particles or drops from the desired locations in the air are, thus, prevented in the present invention and the uncomplete combustion of gasoline-semi fluid-or powder-cake engines of the former art which led to poisenous exhausts and waste of portions of fuel, are prevented by the present invention.

More details of the structures, members, configurations, actions, effects, results, aims or objects of the invention and its means are defined in the following claims, whereby the following claims are considered to belong to the disclosure of this present patent application.

What is claimed is:

1. A combustion engine, comprising, in combination, at least one compressor in communication with at least one combustion chamber, said combustion chamber in communication with at least one expander, while said expander drives said compressor and has an output means for the supply of power out of said combustion engine; a fuel supplied into said combustion chamber and subjected therein to burn at least partially in the compressed hot air which flows from said compressor to and through said combustion chamber and said expander when the moveable parts of said compressor and expander move under the forces of the expanding gases in said expander;

wherein a fuel supply arrangement is provided and said fuel supply arrangement comprises, in combination a fuel container with a storage space, a transfer mechanism and longitudinally straight rigid fuel bars of equal cross sectional configuration throughout their entire lengths in said storage space, wherein said transfer mechanism includes a linearly moving member, wherein said linearly moving member touches at least one of said fuel bars to move the respective fuel bar forward in a linear direction towards a smasher device in front of said respective fuel bar to powderize the front end of said respective fuel bar to powder in a permanently continuing operation, wherein a fuel powder transfer device is provided between said smasher device and said combustion chamber for the transfer of the pulverized fuel from said smasher device to and into said combustion chamber, and;

wherein a plurality of said fuel bars are provided side by side with an outer face of one of said fuel bars meeting an outer face of a neighboring fuel bar to prevent the presence of excessive air between said fuel bars.

2. The engine of claim 1, wherein a fuel bar guide way is provided in said storage space to separate at least one of said fuel bars from neighboring air.

3. The engine of claim 1, wherein said fuel powder transfer device is a reciprocatingly provided piston which periodically transfers portions of said fuel powder into said combustion chamber with said combustion chamber being provided in a passage between the chambers of said compressor and chambers of said expander.

4. The engine of claim 1, wherein said fuel powder transfer device includes a revolving disc which is provided with a plurality of individual fuel powder transfer chambers which alternatingly communicate by a first communication with a passage from said smasher device to said revolving disc and which communicate after the closing of said first communication by a second communication with a passage from said compressor and with a passage from said revolving disc to said combustion chamber.

5. The engine of claim 1, wherein said fuel powder transfer device includes a revolving disc which is provided with a plurality of individual fuel powder transfer chambers which alternatingly communicate by a first communication with a passage from said smasher device to said revolving disc and which communicate after the closing of said first communication by a second communication with a passage which extends from a passage between said combustion chamber and the chambers of the expander over an assessory compressor to a portion of said revolving disc and with a passage from said revolving disc to said combustion chamber.

* * * * *